(12) United States Patent
Gstir et al.

(10) Patent No.: US 7,134,173 B2
(45) Date of Patent: Nov. 14, 2006

(54) SPINDLE HEAD FOR A UNIVERSAL MILLING MACHINE

(75) Inventors: Walter Gstir, Schattwald (AT); Peter Haas, Rieden (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 0 days.

(21) Appl. No.: 10/508,176

(22) PCT Filed: Mar. 11, 2003

(86) PCT No.: PCT/EP03/02488

§ 371 (c)(1),
(2), (4) Date: May 2, 2005

(87) PCT Pub. No.: WO03/078101

PCT Pub. Date: Sep. 25, 2003

(65) Prior Publication Data

US 2005/0217095 A1 Oct. 6, 2005

(30) Foreign Application Priority Data

Mar. 19, 2002 (DE) .......................... 202 04 365 U

(51) Int. Cl.
*B23P 23/00* (2006.01)
*B23C 1/14* (2006.01)
(52) U.S. Cl. .................. 29/27 C; 409/270; 409/201; 409/203

(58) Field of Classification Search ............... 409/201, 409/203, 165, 192, 198, 270; 29/27 C
See application file for complete search history.

(56) References Cited

U.S. PATENT DOCUMENTS

| 3,460,435 | A | * | 8/1969 | Dahl et al. ................ 409/183 |
| 3,888,161 | A | * | 6/1975 | Baudermann ............... 409/132 |
| 4,313,478 | A | * | 2/1982 | Suzuki ...................... 409/201 |
| 4,512,380 | A | * | 4/1985 | Schmidt .................... 409/198 |
| 5,134,762 | A | * | 8/1992 | Scott ........................ 29/26 A |
| 5,439,431 | A | * | 8/1995 | Hessbruggen et al. ....... 483/14 |
| 5,535,496 | A | * | 7/1996 | Sugino et al. ............... 29/39 |

(Continued)

FOREIGN PATENT DOCUMENTS

DE 88 09 972.9 11/1988

(Continued)

OTHER PUBLICATIONS

Prospectus "MAHO MH 1000C Universal-Fräs- Und Bohrmaschine", MAHO Werkzeugmaschinenbau Babel & Co., Pfronten (DE), Jun. 1984, 19 pages.

*Primary Examiner*—Monica Carter
*Assistant Examiner*—Dana Ross
(74) *Attorney, Agent, or Firm*—The Maxham Firm

(57) ABSTRACT

A spindle head for a universal milling machine having a housing rotatably mounted on a machine part and a work spindle mounted axially parallel in the housing. A second spindle unit adjustable about two axes is disposed on the rear side of the housing.

4 Claims, 2 Drawing Sheets

U.S. PATENT DOCUMENTS

| | | |
|---|---|---|
| 5,664,308 A | 9/1997 | Deitert |
| 5,699,598 A * | 12/1997 | Hessbruggen et al. ...... 29/27 C |
| 5,730,691 A * | 3/1998 | Tokura et al. ................ 483/56 |
| 5,842,259 A * | 12/1998 | Hardesty et al. ......... 29/48.5 A |
| 6,016,729 A * | 1/2000 | Pfeifer et al. ................... 29/40 |
| 6,257,111 B1 * | 7/2001 | Shinohara et al. .......... 29/26 A |
| 6,352,496 B1 * | 3/2002 | Oldani ........................ 483/55 |
| 6,825,630 B1 * | 11/2004 | Katoh et al. .................... 29/40 |
| 6,865,789 B1 * | 3/2005 | Katoh et al. .................... 29/40 |
| 2001/0046422 A1 * | 11/2001 | Colombo .................... 409/201 |
| 2004/0151556 A1 * | 8/2004 | Ferrari et al. ............... 409/201 |

FOREIGN PATENT DOCUMENTS

| | | |
|---|---|---|
| DE | 43 08 419 A1 | 9/1994 |
| DE | 198 00 034 C2 | 7/1999 |
| DE | 299 07 810 U1 | 9/1999 |
| DE | 198 50 603 A1 | 5/2000 |
| DE | 199 18 082 A1 | 11/2000 |
| DE | 296 23 999 U1 | 4/2001 |
| DE | 100 27 509 A1 | 12/2001 |
| EP | 1 038 630 A1 | 9/2000 |
| EP | 1 074 338 A2 | 2/2001 |
| FR | 2 694 720 A1 | 2/1994 |

\* cited by examiner

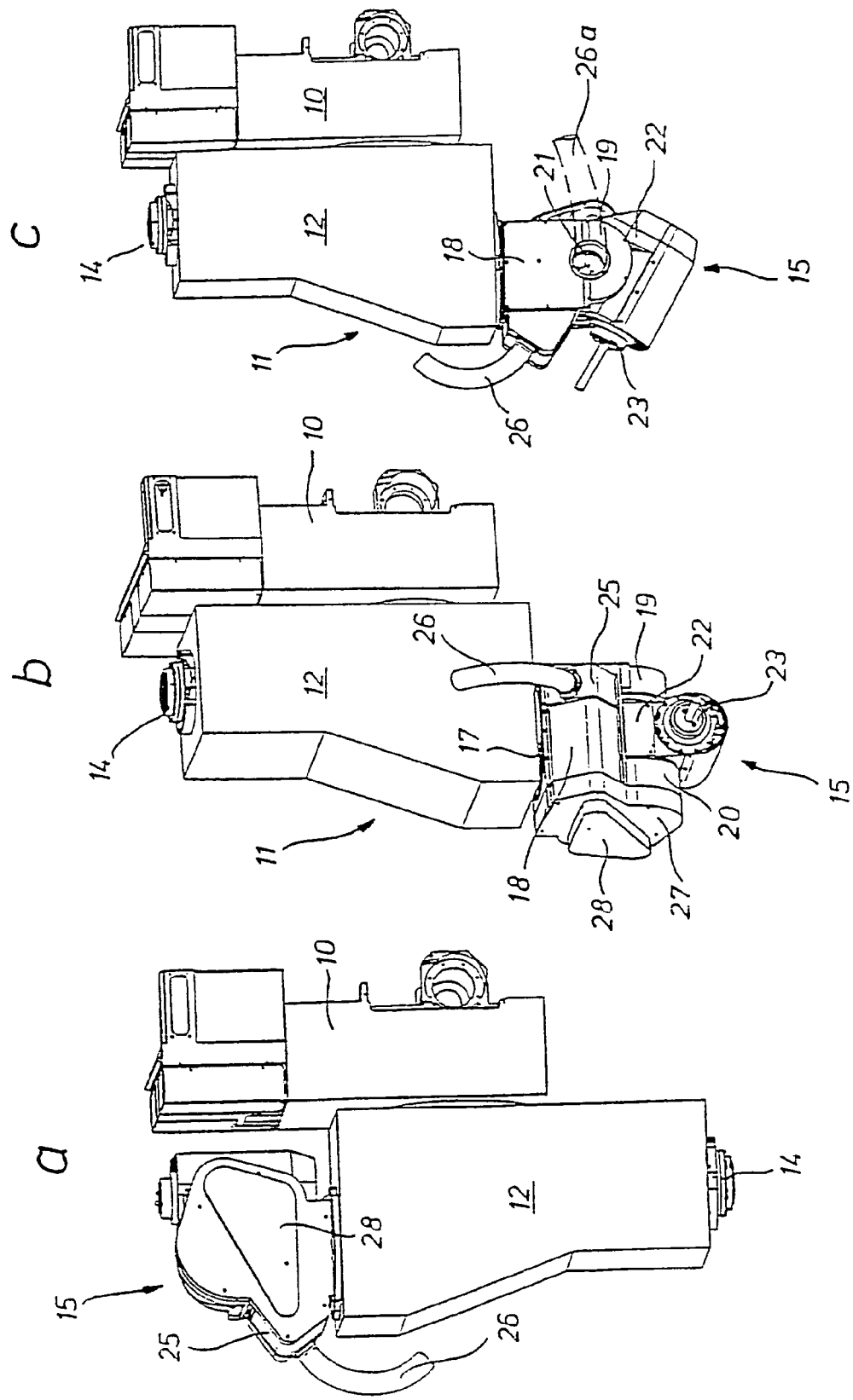

SPINDLE HEAD FOR A UNIVERSAL MILLING MACHINE

BACKROUND OF THE INVENTION

1. Field of the Invention

The invention relates to a spindle head for a universal milling machine of the type specified in the preamble of the claims as well as a universal milling machine provided with such a spindle head.

2. Discussion of Related Art

In recent times the complex machining of workpieces in one setting is aspired to increase product performance and accuracy. Various universal milling machines are already known in which even relatively large and bulky workpieces may be processed by milling and turning using rotatably driven round tables. Besides it has long been customary to carry out roughing and finishing works on a workpiece in the same machine. To this end, however, the different tools have to be inserted into and extracted from a single work spindle, which of course leads to a certain delays.

Further, universal milling machines comprising two milling or spindle heads provided on a common console are known, for example, from the DE 299 07 810 U. The console has the form of an equal-sided, rectangular prism, and its hypotenuse surface is supported on a 45° support surface so as to be rotatable about its center axis. On each of its two catheter surfaces which are rectangular to each other a milling head is fixedly mounted. By a motor-driven rotational movement of the console about its 45° axis the one or the other milling head can be brought into the machining position in which the milling or drilling tool inserted into its respective work spindle machines the workpiece in the same setting. The console required for the exchange of the milling spindles limits the free work space and necessitates considerable additional construction- and cost-related expenses.

In the DE 296 23 999 U1 a directly driven, multi-articulated rotational spindle head for milling machines is described which comprises a fork rotatable about a first axis and comprising two spaced fork arms. In the fork arms aligned bores are formed in which a work spindle is rotatably supported via two diametrically protruding rods. To rotate the fork about the first axis and to pivot the work spindle in the fork bores a direct drive in the form of an electric motor is used.

Further a non-generic device for positioning a workpiece is known from the DE 88 09 972 U, the device comprising a plane disk on which the workpiece is accommodated. The positioning device is to be expandable and extensible by drive units capable of being combined in different ways so that the plane disk can be rotated about a first axis by means of a motor, pivoted about a second axis by means of a motor and/or pivoted about a third axis by means of a motor.

SUMMARY OF THE INVENTION

It is the object of the invention to provide a spindle head for a universal milling machine enabling the complex machining of even bulky workpieces having a large volume in one setting with reduced delays.

According to the invention said object is solved by the features specified in the claims.

The work area of the machine tool provided with the spindle head is considerably increased by the invention. The first work spindle incorporated in the spindle housing is designed for carrying out the different milling and drilling operations, and it is also dimensioned for roughing operations. Accordingly the normally required machining operations can each be carried out with a high machining performance using this work spindle. Roughing and coarser finishing operations are equally possible. The provision of a second spindle unit which is adjustable in two axes on the rear side of the spindle housing extends the work area of a machine tool since now fine finishing operations, engraving operations, fine drilling and the like can also be carried out in a simple manner and without a previous tool exchange. With the possibility to adjust the second work spindle in two axes perpendicular to each other inclined bores and grooves, undercuts as well as, with continuous angular adjustments, even spherical surfaces can be produced on the workpiece in a simple manner.

A further object of the invention is a machine tool provided with a spindle head designed as described above and a round table for accommodating large and bulky workpieces comprising an efficient rotational drive capable of rotating the workpiece with several 100 rpm. This additionally enables the execution of certain turning operations on the workpiece after the insertion of a turning tool, preferably into the first, more efficient work spindle. In addition, however, milling operations may as well be carried out on the rotating workpiece with the second spindle.

Efficient further developments and embodiments of the invention are defined in the sub-claims.

To obtain a high flexibility combined with a good stiffness the second spindle unit comprises a fork head rotatably mounted on the rear side of the spindle housing, a directly driven work spindle being pivotably supported between its fork. Conveniently said work spindle may be a high-speed spindle (HS spindle) with a rotation speed of more than 20,000 rpm.

Conveniently the fork head is structurally designed so that its rotational axis is parallel to the axis of the work spindle incorporated in the housing and laterally offset so that the two spindle axes are aligned, i.e. coincide, in case of an axially parallel orientation of the two work spindles.

Work spindles are usually connected to two supply systems, i.e. power supply and flushing, via two flexible tube feeders. According to an efficient embodiment of the invention only a single flexible supply tube is connected to the fork head, the connection to the second supply system being provided by a rotatable internal passage of the fork head leading to the spindle housing.

In accordance with another efficient embodiment of the invention an electric motor and a gearbox serving as pivoting drive for the second work spindle are provided on the fork head and another electric motor is provided as a direct drive for rotating the fork head to adjust the angular setting of the work spindle in the forks and the rotational position of the fork head on the spindle housing and, particularly, to fix the set positions in a sufficiently secure manner.

BRIEF DESCRIPTION OF THE DRAWING

Further particularities and advantages of the invention will become apparent from the following description of the spindle head according to the invention provided in a universal milling machine with reference to the drawings in which:

FIG. 2 is a schematic perspective representation of different operating postures of the spindle head, respectively.

DETAILED DESCRIPTION OF THE PREFERRED EMBODIMENTS

Figure 1:
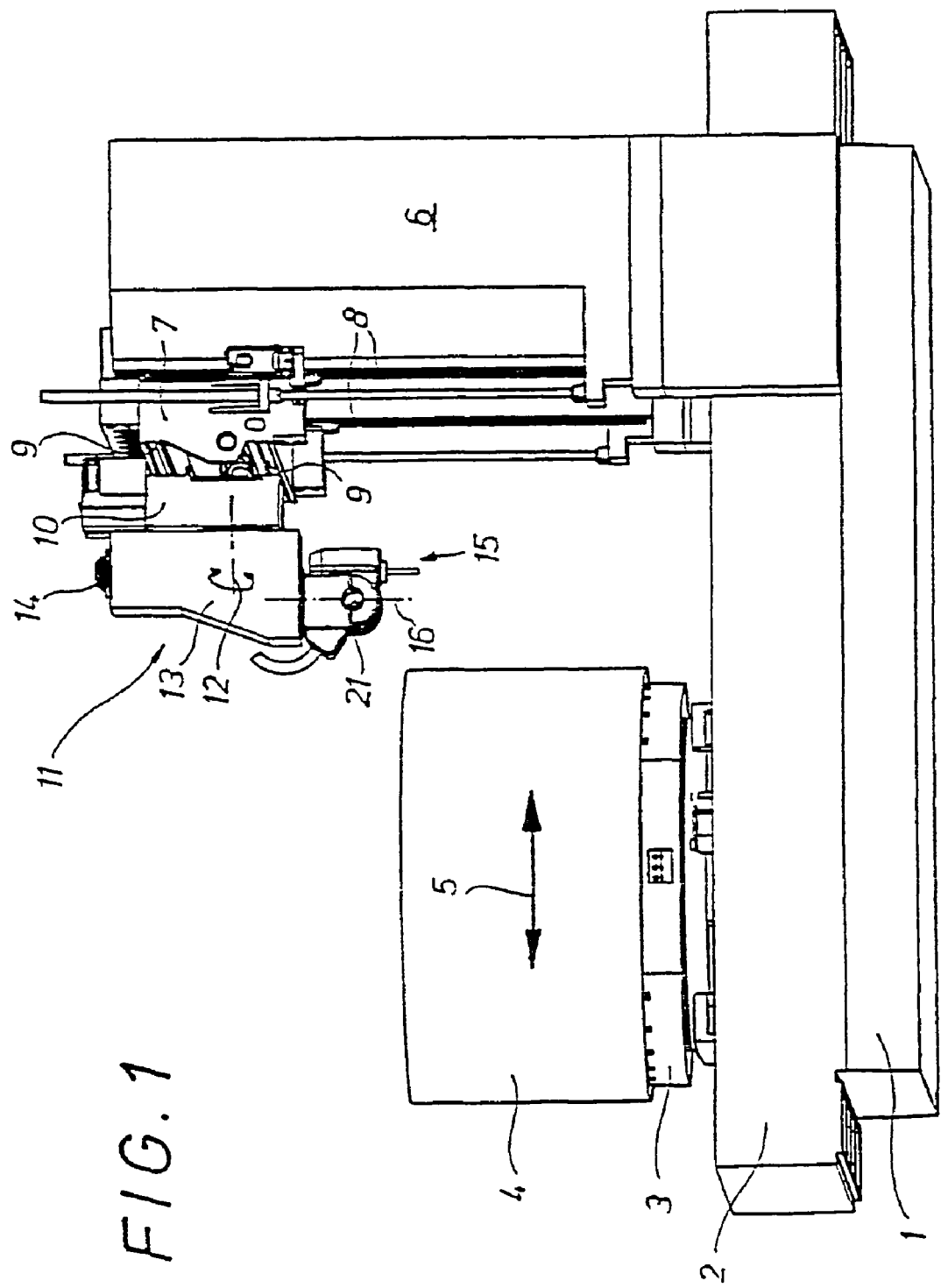
FIG. 1 is a schematic perspective representation of a universal milling machine provided with the spindle head according to the invention.

The universal milling machine shown in FIG. 1 comprises a continuous, highly rigid machine bed 2 provided on a base 1, a round table 3 with a cylindrical workpiece 4 clamped thereon being disposed on said machine bed 2 so as to be shiftable in the direction of an arrow 5 by means of a motor. Further, a column 6 having a bridge structure is supported on the base 1, a slide 7 being disposed on the front side of the column 6 facing the workpiece 4 so as to be shiftable in vertical guides 8 by means of a motor. On horizontal front rails 9 of said vertical slide 7 a horizontal slide 10 is guided on the front side of which a spindle head 11 is fixed so as to be rotatable about a horizontal axis 12 by means of a motor. Said spindle head 11 comprises a housing 13 in which a first work spindle 14 is accommodated together with a direct driving motor. A first rotational drive for a fork head 15 is provided in the lower part of the spindle housing 13 which is widened according to FIG. 1, said fork head 15 being mounted on the opposite end side of the housing so as to be rotatable about an axis 16.

As will become apparent particularly from FIG. 2b the fork head 15 is fixed to the rear wall via a rotatable disk surrounding a rotating passage (not shown) for a first type of supply line. The fork head 15 comprises a housing part 18 and two end side forks 19, 20 each having an opening 21 in which a spindle housing 22 is supported by two bearing rods so as to be pivotable about the rod axis. In the spindle housing 22 the second work spindle 23 is accommodated together with its drive motor (not shown). On the one side of the housing part 18 of the fork head 15 a port 25 for a single flexible supply tube 26 is provided. As can be seen in FIGS. 2a, 2b an electric drive motor is provided on the other side of the fork head 15 in a narrow housing part 27, said drive motor pivoting the second work spindle 23 together with its housing 22 about the bearing rods 21 by means of a gear box covered by a lateral lid 28 and fixing it in the respectively desired spindle posture with a sufficiently high retaining momentum.

As partly shown in FIG. 2 the spindle head according to the invention is capable of performing numerous machining operations in different postures. In the operating posture according to FIG. 2a the particularly effective first spindle 14 is ready for operation, i.e. after the insertion of a corresponding tool particularly roughing operations may be carried out on the workpiece 4. For carrying out various fine operations on the workpiece 4 the spindle head is rotated about its horizontal axis 12 by 180° so that the fork head is then disposed in its working position with its second work spindle 23. For a collision-free rotation of the spindle head 11 it is important that the different components of the fork head do not or not substantially protrude from the spindle housing 12 as can be seen, for example, in FIGS. 1 and 2a.

The invention is not limited to the illustrated embodiment. If a so-called console machine comprising a vertically shiftable workpiece table is employed, for example, the spindle head according to the invention can also be formed as a horizontal head and may be disposed, for example, on the upper side of a column so as to be rotatable about a vertical axis. Besides, various variants of the fork head are possible, for example an omission of the one or the other fork 19, 20 so that the housing 22 of the fine spindle is only supported and rotatably borne on one side. Finally a so-called direct drive may be used as a pivoting drive for the fine spindle 23 the stator of said direct drive being fixed in at least one of the forks 19, 20 and the rotor of such an electric motor being fixed to the respective bearing rod of the spindle housing 22. With such a direct drive the gear box covered by the lid 28 may be omitted. As a further variant the supply tube may be connected to the rod bearing 21 of the fine spindle housing 22 as indicated by the dotted lines in FIG. 2c.

The invention claimed is:

1. A spindle head for a universal milling machine which has a workpiece table, said spindle head comprising:
    a machine part shiftable on a machine column and an elongated first housing mounted on the machine part so as to be rotatable about a first axis;
    a directly driven first work spindle having a second axis and being mounted axially parallel in the elongated first housing for carrying out roughing and finishing operations on the workpiece set up on the workpiece table; and
    a second spindle unit adjustable about two axes disposed on the end side of the elongated first housing opposed to the first work spindle, said second spindle unit comprising a second work spindle provided in a spindle housing, said second spindle unit further comprising a drive motor, said second spindle unit comprising a fork head rotatable about a rotation axis, the spindle housing of the second work spindle being supported in the forks of the fork head so as to be pivotable by means of a second motor about a third rotation axis, the rotation axis of the fork head extending parallel to the second axis of the work spindle and laterally offset with respect to the housing.

2. The spindle head according to claim 1, wherein the fork head comprises an electric motor and a gear box service as a pivoting drive for said second work spindle.

3. The spindle head according to claim 1, wherein the pivoting axis of said second work spindle, the rotation axis of the fork head, and the third rotation axis of the spindle housing extend in planes rectangular to each other.

4. A universal milling machine comprising:
    a round table rotatably supported on a highly stiff machine bed for accomomodating a bulky and large workpiece;
    an effective rotational drive for the round table capable of rotating the workpiece at several hundred rpm for performing turning operations;
    a machine column comprising a slide shiftable on the front side along two coordinate axes by means of a motor; and
    a spindle head provided on the front side of said machine column so as to be rotatable about a horizontal rotation axis by means of a motor, said spindle head comprising:
        a machine part shiftable on a machine column and an elongated first housing mounted on the machine part so as to be rotatable about a first axis;
        a directly driven first work spindle having a second axis and being mounted axially parallel in the elongated first housing for carrying out roughing and finishing operations on the workpiece set up on a workpiece table; and
        a second spindle unit adjustable about two axes disposed on the end side of the elongated first housing opposed to the first work spindle, said second spindle unit comprising a second work spindle provided in a spindle housing, said second spindle unit further comprising a drive motor, said second spindle unit comprising a fork head rotatable about a rotation axis, the spindle housing of the second work spindle being supported in the forks of the fork head so as to be pivotable by means of a second motor about a third rotation axis, the rotation axis of the fork head extending parallel to the second axis of the work spindle and laterally offset with respect to the housing.

* * * * *

UNITED STATES PATENT AND TRADEMARK OFFICE
CERTIFICATE OF CORRECTION

PATENT NO. : 7,134,173 B2  Page 1 of 1
APPLICATION NO. : 10/508176
DATED : November 14, 2006
INVENTOR(S) : Walter Gstir et al.

It is certified that error appears in the above-identified patent and that said Letters Patent is hereby corrected as shown below:

On The Title Page: Item (75) inventors should read

-- Walter Gstir, Schattwald (AT); Peter Haas, Rieden (DE); Helmut Fritz, Hopferau (DE) --.

Signed and Sealed this

Twentieth Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 7,134,173 B2  Page 1 of 1
APPLICATION NO. : 10/508176
DATED : November 14, 2006
INVENTOR(S) : Walter Gstir et al.

It is certified that error appears in the above-identified patent and that said Letters Patent is hereby corrected as shown below:

On The Title Page: Item (75) Inventors should read

-- Walter Gstir, Schattwald (AT); Peter Haas, Rieden (DE); Helmut Fritz, Hopferau (DE) --

Signed and Sealed this

Sixth Day of March, 2007

JON W. DUDAS
*Director of the United States Patent and Trademark Office*